(12) United States Patent
Abdullah et al.

(10) Patent No.: US 9,337,880 B2
(45) Date of Patent: May 10, 2016

(54) METHOD AND APPARATUS FOR OVERRIDING A PTT SWITCH TO ACTIVATE A MICROPHONE

(75) Inventors: Mohd Faisal Abdullah, Penang (MY); Yusasmadi Yusof, Penang (MY)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/424,896

(22) PCT Filed: Aug. 30, 2012

(86) PCT No.: PCT/MY2012/000248
§ 371 (c)(1),
(2), (4) Date: Feb. 27, 2015

(87) PCT Pub. No.: WO2014/035232
PCT Pub. Date: Mar. 6, 2014

(65) Prior Publication Data
US 2015/0244406 A1    Aug. 27, 2015

(51) Int. Cl.
| | | |
|---|---|---|
| H04B 1/38 | (2015.01) | |
| H04B 1/3827 | (2015.01) | |
| H04B 1/46 | (2006.01) | |
| H04M 1/60 | (2006.01) | |
| H04R 3/00 | (2006.01) | |
| H04W 4/10 | (2009.01) | |

(52) U.S. Cl.
CPC ............. *H04B 1/3827* (2013.01); *H04B 1/385* (2013.01); *H04B 1/46* (2013.01); *H04M 1/6041* (2013.01); *H04R 3/00* (2013.01); *H04W 4/10* (2013.01); *H04R 2499/11* (2013.01)

(58) Field of Classification Search
CPC ........ H04B 1/385; H04B 1/46; H04B 1/3827; H04W 4/10; H04R 3/00; H04R 2499/11; H04M 1/6041
See application file for complete search history.

(56) References Cited

U.S. PATENT DOCUMENTS

| | | | | |
|---|---|---|---|---|
| 4,932,071 A | * | 6/1990 | Arndt | H04B 7/18506 340/7.58 |
| 5,230,089 A | * | 7/1993 | Kindinger | H04B 1/46 379/388.02 |
| 5,650,901 A | | 7/1997 | Yamamoto | |
| 7,023,983 B2 | | 4/2006 | King | |
| 7,912,501 B2 | | 3/2011 | Johnson et al. | |
| 2004/0022395 A1 | * | 2/2004 | Turnbull | H04M 1/6058 381/74 |
| 2004/0056702 A1 | | 3/2004 | Nagasu et al. | |

(Continued)

FOREIGN PATENT DOCUMENTS

| | | |
|---|---|---|
| EP | 1 881 511 A1 | 1/2008 |
| WO | 86/01334 A1 | 2/1986 |

(Continued)

OTHER PUBLICATIONS

International Search Report and Written Opinion for corresponding International Patent Application No. PCT/MY2012/000248, mailed on Jul. 15, 2013.

(Continued)

*Primary Examiner* — Ping Hsieh

(57) ABSTRACT

A method and apparatus for operating a bypass switch (124, 202) for bypassing a PTT switch (120) when a two-way radio device system (100) is to be operated in a hands-free mode responsive to a voltage applied to a microphone input line (114) in a pre-selected range.

18 Claims, 4 Drawing Sheets

(56) References Cited

U.S. PATENT DOCUMENTS

| | | |
|---|---|---|
| 2004/0137960 A1 | 7/2004 | Chung |
| 2004/0203879 A1 | 10/2004 | Gardner et al. |
| 2007/0297623 A1 | 12/2007 | Kuiri |
| 2008/0057893 A1* | 3/2008 | Patla ................ H04M 1/72519 455/187.1 |
| 2009/0084451 A1 | 4/2009 | Quinn et al. |
| 2009/0201617 A1 | 8/2009 | Yamaguchi |
| 2012/0026640 A1 | 2/2012 | Doellerer et al. |
| 2012/0051554 A1 | 3/2012 | Modi et al. |
| 2012/0087049 A1 | 4/2012 | Komatsu et al. |

FOREIGN PATENT DOCUMENTS

| | | |
|---|---|---|
| WO | 89/09665 A1 | 2/1999 |
| WO | 2011/044928 A1 | 4/2011 |

OTHER PUBLICATIONS

Storr W., "Thyristor Circuit," Thyristor Circuit and SCR Switching Circuits, Retrieved from the Internet URL: http://web.archive.org/web/20120820133751/http://www.electronics-tutorials.ws/blog/thyristor-circuit.html dated Apr. 3, 2012, pp. 1-3.

* cited by examiner

_US 9,337,880 B2_

METHOD AND APPARATUS FOR OVERRIDING A PTT SWITCH TO ACTIVATE A MICROPHONE

FIELD OF THE DISCLOSURE

The present disclosure relates generally to two-way radios and more particularly to controlling bypass operation of a push to talk (PTT) switch in a two-way radio device system.

BACKGROUND

Two-way radios are radio communication devices that transmit and receive radio signals which typically are modulated voice or audio signals. Two-way radios typically use half duplex operation where they can either transmit or receive, but not both at the same time. In an idle state a two-way radio monitors one or more selected radio channels, and a PTT switch. If the two-way radio detects a signal on the monitored channel or channels, it begins to receive the transmitted signal. By "receive" it is meant that the transmitted information is demodulated and processed for perception by the user, or other operation by the two-way radio that is beyond merely monitoring the channel or channels. Once the monitoring detects a signal in a monitored channel, the two-way radio changes from the idle state to a receive state. When audio signals are received over the channel, they are played over a speaker connected to, or integrated with the two-way radio. Generally the audio signals are played at a volume level sufficient to be heard by the two-way radio user at a distance from the two-way radio. Similarly, while in the idle state, if the user keys up the radio by pressing and holding a PTT button, the two-way radio will immediately transmit, or attempt to transmit. Typically, it is the user's voice being transmitted, and more sophisticated two-way radios will, upon the PTT button being keyed (held), check to make sure the channel is available.

Given the immediacy of communication over other forms of wireless communication, such as, for example, cellular telephony, two-way radio communication has maintained popularity, especially in situations where immediate communication can be essential, such as in public safety operations (e.g. police, fire, rescue). While two-way radios made for public safety organizations tend to be sophisticated, feature-rich devices, there is also a market for low cost two-way radios, with fewer features, referred to as "low tier" radios. Two-way hand held portable radios (as opposed to, for example, vehicle mounted radios) are typically designed to be operable with accessories, ranging from a simple earphone audio jack to more sophisticated accessories. One feature that is provided in more the more expensive and sophisticated two-way radios is voice activated transmit operation, where the user's voice, rather than the PTT switch, controls transmission. With voice controlled transmission, when the audio energy at the microphone exceeds a threshold, the radio begins transmitting. Simple accessory connectors do not offer the ability to provide sophisticated accessory operation, however, and the control lines used for accessory connectors of more expensive radios are not available in low tier radios.

Accordingly, there is a need for a method and apparatus for providing features normally available only on higher tier two-way radios on lower cost two-way radios that have limited accessory connection interfaces.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
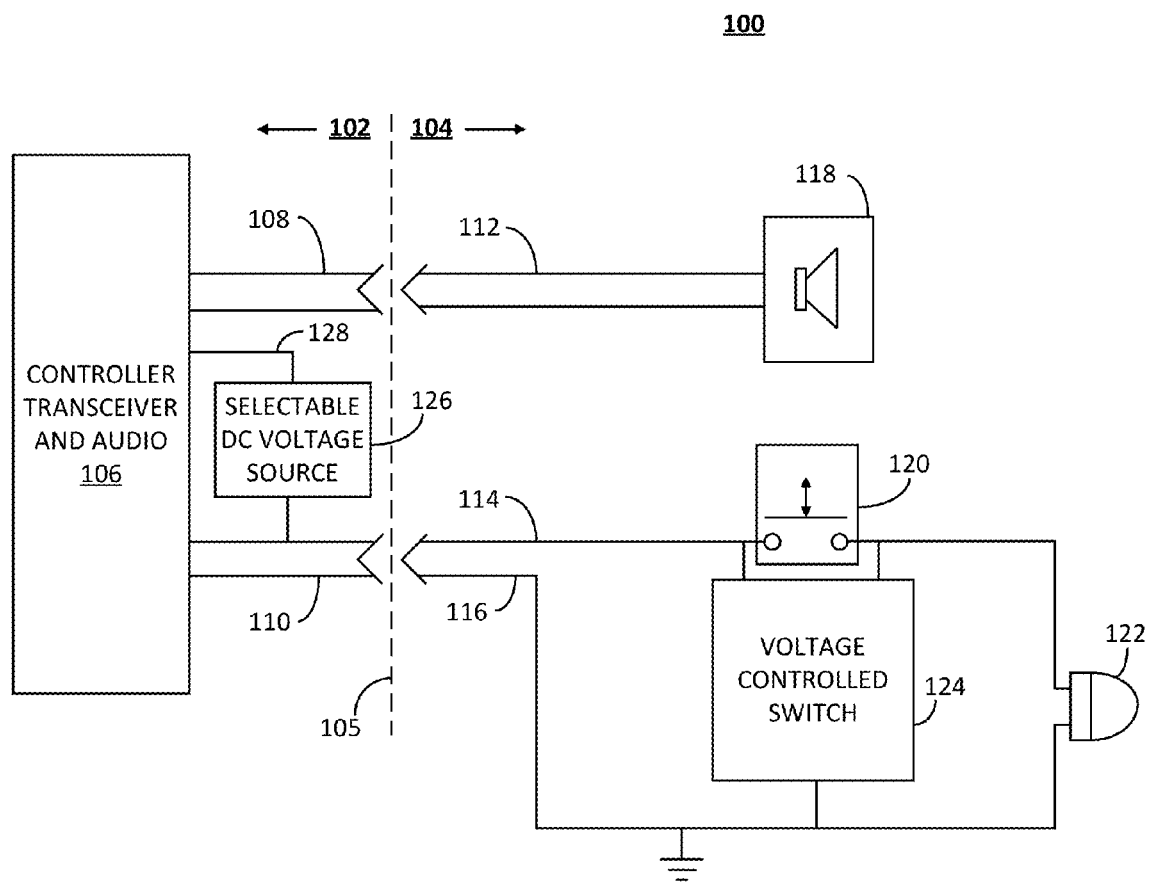
FIG. 1 is a block diagram of a two-way radio device system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments can include a method that comprises detecting connection of a remote speaker accessory to a two-way radio. The remote speaker accessory can contain a push to talk (PTT) switch that is coupled in series between a microphone and a microphone input of the remote speaker accessory. The remote speaker accessory can further include a voltage controlled bypass switch connected in parallel with the PTT switch and operable to be closed upon application of a voltage above a threshold level on the microphone input. The method can further include applying a first voltage level to the microphone input. The first voltage level is below the threshold level. The method can further include detecting an indication to operate the microphone in a hands-free mode, and responsive to detecting the indication to operate in the hands-free mode, apply a second voltage level to the microphone input. The second voltage level is above the threshold level, causing the voltage controlled bypass switch to close, and thereby bypass the PTT switch.

Some embodiments can include an apparatus that comprises a microphone, and a PTT switch that is electrically coupled in series with the microphone, between the microphone and a microphone input. The apparatus can further include a voltage controlled switch circuit comprising a first transistor switch element coupled in parallel with the PTT switch, and a second transistor switch coupled to the first transistor switch that is operable to close the first transistor switch when an input voltage on the microphone input is in a first voltage range. When the first transistor switch is closed it bypasses the PTT switch and applying a voltage on the microphone input to the microphone regardless of the PTT switch, and to open the first transistor switch when the input voltage is in a second voltage range.

FIG. 1 is a block diagram of a two-way radio device system 100 in accordance with some embodiments. The two-way radio device system 100 as illustrated here can include two devices; a two-way radio 102 and an audio accessory 104 for use with the two-way radio 102 which is connectable to the two-way radio via an interface 105. The two-way radio 102 is a device that includes control, radio transceiver, and audio processing functions 106. Generally, the two-way radio 102 includes circuitry and components for transmitting and receiving radio signals, and in particular transmitting and receiving audio voice information via radio signals. The two-way radio 102 typically also includes user interface elements, such as a graphical display, keypad, buttons, and so on, to allow a user to control operation of the two-way radio, and a controller, such as a microprocessor which executes instruction code designed in accordance with the desired operation of the two-way radio 102. The audio accessory 104 is coupled to the two-way radio at the interface 105, which can be, for example, a pair of audio jacks disposed in the two-way radio 102 which mate with corresponding audio plugs of the audio accessory 104, as is well known. In some embodiments a pair of speaker signal conductors 108 in the two-way radio 102 can be connected to a pair of speaker conductors 112 in the audio accessory 104 which provide audio signals to a speaker or speaker assembly 118. Likewise, a pair of microphone conductors 110 in the two-way radio 102 can be connected to a microphone input line 114 and a ground reference, or return line 116 of the audio accessory 104. A push to talk (PTT) switch 120 is coupled in series between the microphone input 114 and a microphone 122 (which is connected to the ground 116). A voltage controlled switch 124 is coupled in parallel with the PTT switch 120. The microphone 112 is operable with a direct current (DC) bias voltage in both a first voltage range and a second voltage range.

In accordance with some embodiments, the two-way radio 102 provides a direct current (DC) voltage on the microphone input 114, such as from a selectable DC voltage source 126. The DC voltage can be applied to the microphone 122 to activate the microphone and allow the microphone to produce microphone signals, which are electrical audio signals corresponding to acoustic signals incident on the microphone. The microphone signals are fed to the two-way radio over the microphone input 114 where the two-way radio 102 can receive the microphone signals through a DC blocking capacitor (not shown) in the audio component 106. To apply the DC voltage to the microphone, either the PTT switch 120 or the voltage controlled switch 124 must be closed. The two-way radio device system 100 can be operated in either a regular PTT mode, where the PTT switch 120 must be pressed to commence transmission, or a hands-free mode, where the voltage controlled switch bypasses the PTT switch 120, and transmission can be performed, for example, upon voice activity detection. To operate in a PTT mode, the selectable DC voltage source 126 is controlled, such as via control or selection line or lines 128, to provide a first DC voltage level on the microphone input 114. The first DC voltage level is in a first voltage range that does not cause the voltage controlled switch 124 to close, thereby bypassing the PTT switch 120. When the two-way radio is to be operated in a hands-free mode, such as in response to an indication to operate in a hands-free mode, the two-way radio 102 controls the selectable DC voltage source 126 to provide a different, second DC voltage level on the microphone input 114. The second DC voltage level is in a second range that causes the voltage controlled switch circuit 124 to close, thereby bypassing the PTT switch 120. The first and second DC voltage ranges that cause the voltage controlled switch 124 to be open or closed, respectively, can be defined by a threshold voltage level of the voltage controlled switch 124. Thus, the PTT switch is only bypassed when the voltage applied to the microphone input 114 is in the second DC voltage range in the present example. For example, the first voltage range can be below a threshold voltage of the voltage controlled switch 124, and the second voltage range can be above the threshold voltage of the voltage controlled switch 124. The audio accessory 104 can be, for example, a remote speaker accessory that can be connected to the two-way radio by a multi-conductor cable so that the user can, for example, wear the two-way radio 102 on the user's belt, and a portion of the audio accessory including the speaker 118, microphone 122, and PTT switch 120 can be in a housing component that can be worn near the user's shoulder or on the user's chest, for example. Embodiments allow the audio accessory 104 to be used in a hands-free mode, where the user of the system 100 can speak without having to press a PTT button, and the user's voice will be transmitted by the two-way radio 102. The hands-free mode can be selected by the user in some embodiments, and in some embodiments the hands-free mode can be remotely initiated such as by a command transmitted to the two-way radio 102, allowing remote parties to monitor audio at the user's location. While operating in a hands-free mode the two-way radio 102 can apply noise reduction to the signal produced by the microphone 122, such as by using digital filtering.

Figure 2:
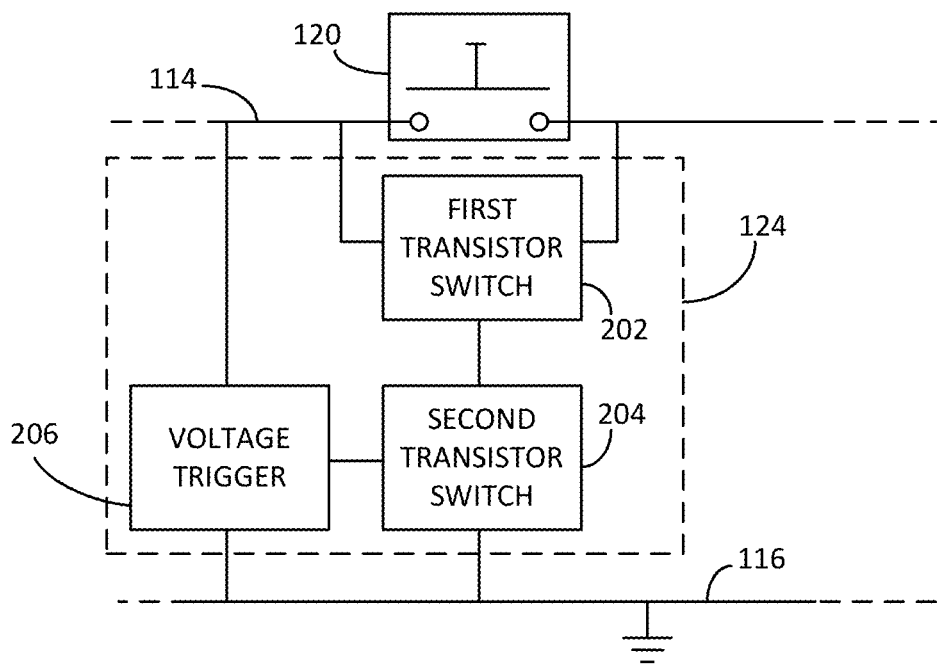
FIG. 2 is a block diagram of a voltage controlled switch arrangement in accordance with some embodiments.

FIG. 2 is a block diagram of a voltage controlled switch arrangement 200 in accordance with some embodiments. In particular, the diagram shows the PTT switch 120 and voltage controlled switch 124 of FIG. 1, with further detail of circuit components used in some embodiments. A first transistor switch or switch circuit 202 is coupled in parallel with the PTT switch 120, and is controlled to be alternatively closed or open, operating as a PTT bypass switch to alternatively bypass the PTT switch 120, or not bypass the PTT switch 120. When the first transistor switch 202 is closed, the PTT switch 102 is electrically bypassed through the first transistor switch 202. The first transistor switch is coupled to, and controlled by a second transistor switch 204 that is controlled by a voltage trigger 206. The voltage trigger 206 provides a control signal or voltage to the second transistor switch 204 when the voltage between the microphone input 114 and the ground 116 reaches or exceeds a threshold level, causing the second transistor switch 204 to change states, from a high impedance state to a low impedance state between the first transistor switch 202 and the ground 116. When first transistor switch 202 is normally in a high impedance (open) state, but when the second transistor switch 204 changes to its low impedance state, it causes the first transistor switch 202 to change to its low impedance (closed) state, electrically bypassing the PTT switch 120.

Figure 3:
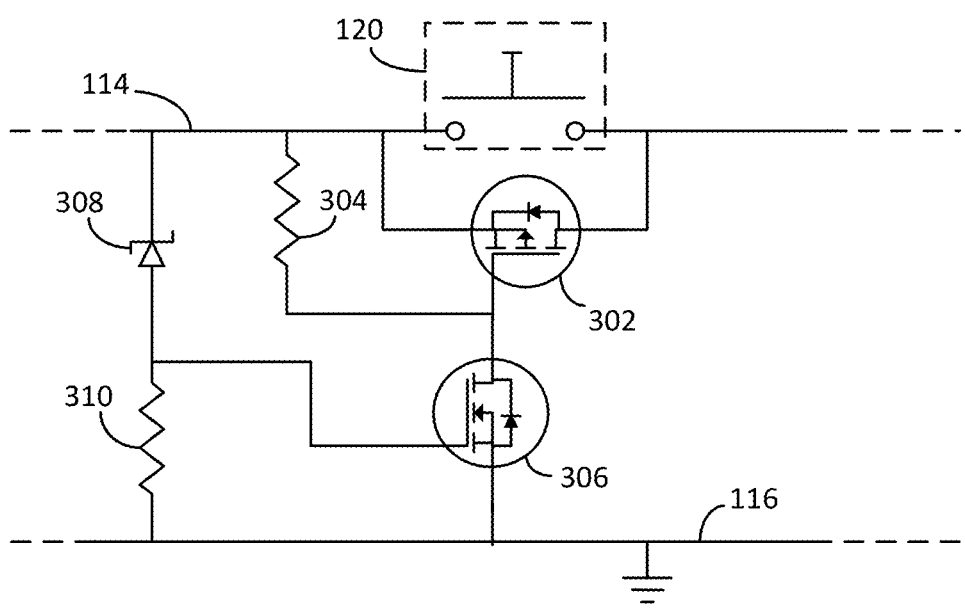
FIG. 3 is a circuit schematic of a switch circuit in accordance with some embodiments.

FIG. 3 is a circuit schematic of a switch circuit 300 in accordance with some embodiments, and illustrates one exemplary implementation of the voltage controlled switch circuit 124. A first transistor switch can be comprised of a P-type, or P-channel metallic oxide semiconductor field effect transistor (MOSFET) 302, and a pull up resistance 304 coupled between the microphone input 114 and the gate of the P-type MOSFET 302. The second transistor switch can be comprised of an N-type MOSFET 306, having its gate coupled to the junction of a zener diode 308 and a pull down resistance 310. The zener diode 308 is coupled in series with the pull down resistance 310 between the microphone input 114 and the ground 116, with the zener diode 308 coupled to the microphone input 114 and the pull down resistance 310 is coupled to the ground 116. The zener diode 308 has a zener breakdown voltage defined across it which, while a voltage applied to the zener diode 308 is below the zener breakdown voltage, substantially no current flows through the zener diode 308 in the zener direction (e.g. from the microphone input 114 towards the ground 116). Accordingly, when the voltage between the microphone input 114 and the ground is below the zener breakdown voltage of zener diode 308, the voltage across pull down resistance 310 is substantially zero. The zener diode 308 and pull down resistance 310 operate in some embodiments as the voltage trigger 206 of FIG. 2. When the voltage between the microphone input 114 and the ground is greater than the zener breakdown voltage of zener diode 308, the voltage across pull down resistance 310 is substantially the difference between the voltage between the microphone input 114 and the ground 116 and the zener breakdown voltage. Accordingly, the voltage applied to the microphone input 114, meaning across the microphone input 114 and ground 116, has to exceed the sum of the zener breakdown voltage and the voltage necessary across the pull down resistance 310 sufficient to turn on (close) the N-type MOSFET 306. By "on" it is meant that the MOSFET is in a low impedance state. Once the N-type MOSFET 306 is turned on, to its low impedance state, it effectively couples gate of the P-type MOSFET 302, which is coupled to one end of the pull up resistance 304, to the ground 116. When the gate of the P-type MOSFET 302 is pulled down due to the N-type MOSFET 306 switching to its low impedance state, the P-type MOSFET 302 likewise switches to a low impedance state.

Accordingly, to operate the two-way radio device system 100 in PTT mode, the selectable DC voltage source 126 should apply a DC voltage to the microphone input 114 that is less than the sum of the turn-on voltage of the N-type MOSFET 306 and the zener breakdown voltage, and preferably less than the zener breakdown voltage. The zener diode 308 should be selected so that the zener breakdown voltage of the zener diode 308 is greater than that necessary to activate the microphone 122 when the PTT switch 120 is closed (PTT button pressed). To bypass the PTT switch 120 and operate in a hands-free mode, the selectable DC voltage source 126 must apply a sufficient DC voltage to the microphone input 114 to turn on the N-type MOSFET 306, and thereby turn on the P-type MOSFET 302.

Figure 4:
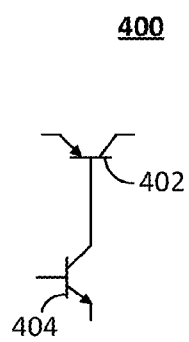
FIG. 4 is a circuit schematic of a switch circuit in accordance with some embodiments.

FIG. 4 is a circuit schematic of a switch circuit 400 in accordance with some embodiments. The switch circuit 400 shows an alternative to the use of MOSFETs as shown in FIG. 3. A P-type transistor 402 can be a PNP bipolar junction transistor (BJT), and can be a Darlington-connected pair of PNP BJTs. An N-type transistor 404 can be an NPN BJT, and can be a Darlington-connected pair of NPN BJTs. The P-type transistor 402 and N-type transistor 404 can be substantially substituted in for the corresponding MOSFETs in FIG. 3, as would be appreciated by those skilled in the art. The P-type transistor 402 can operate as the first transistor switch and the N-type transistor 404 can operate as the second transistor switch, controlling operation of the P-type transistor 402 responsive to an input current at its base.

Figure 5:
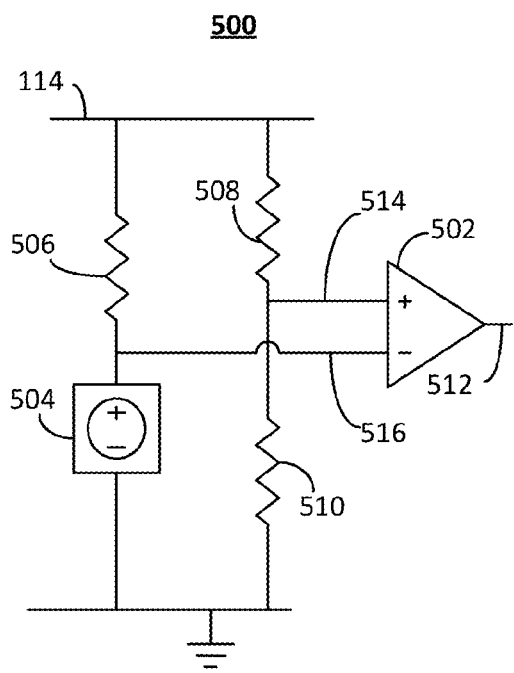
FIG. 5 is a circuit schematic of a voltage sensing circuit in accordance with some embodiments.

FIG. 5 is a circuit schematic of a voltage sensing circuit in accordance with some embodiments. The voltage sensing circuit 500 can be used in some embodiments as the voltage trigger 206 of FIG. 2. The voltage sensing circuit 500 includes a comparator 502. The comparator, as is known, has two inputs 514, 516, typically referred to as a non-inverting input and an inverting input. The comparator provides an output 512 that is at a high voltage level when the non-inverting 514 input as at a higher level than the inverting input 516, and the output is at a low voltage level when the inverting input 516 is higher than the non-inverting input 514. The comparator 502 can compare the voltage on the microphone input 114, as sampled by a voltage divider comprised of resistors 508, 510, with a stable DC reference voltage provided by a voltage reference 504. In some embodiments the voltage reference 504 can be a linear semiconductor regulator, which can be biased through bias resistance 506, which can be internal or external to the linear regulator, as is known. In some embodiments the voltage reference 504 can be a stable DC voltage power source, in which case bias resistance 506 is not needed. The reference voltage provided by the voltage reference 504 will be lower than the normal DC operating range applied to the microphone line 114.

The voltage divider 508, 510 can be selected such that when the voltage applied to the microphone line 114 is at a level corresponding to the PTT mode of operation, the divided input voltage at non-inverting input 514 is lower than the reference voltage provided by the voltage reference 504 on inverting input 516, causing the output 512 to be low (substantially zero), and not high enough to, for example, cause the second transistor switch 204 to trigger. The voltage divider 508, 510 can also be selected so that when the voltage on the microphone line 114 corresponds to operation in the hands-free mode, the voltage at the non-inverting input 514 is higher than the reference voltage provided by the voltage reference 504 to the inverting input 516, causing the output 512 to be high, and sufficient to, for example cause the PTT button (120) to be bypassed. Of course, one of ordinary skill will appreciate that the voltage levels for PTT operation and hands-free operation, applied to the microphone input 514, can be reversed, and the inputs 514, 516 can be likewise switched to produce equivalent operation.

Figure 6:
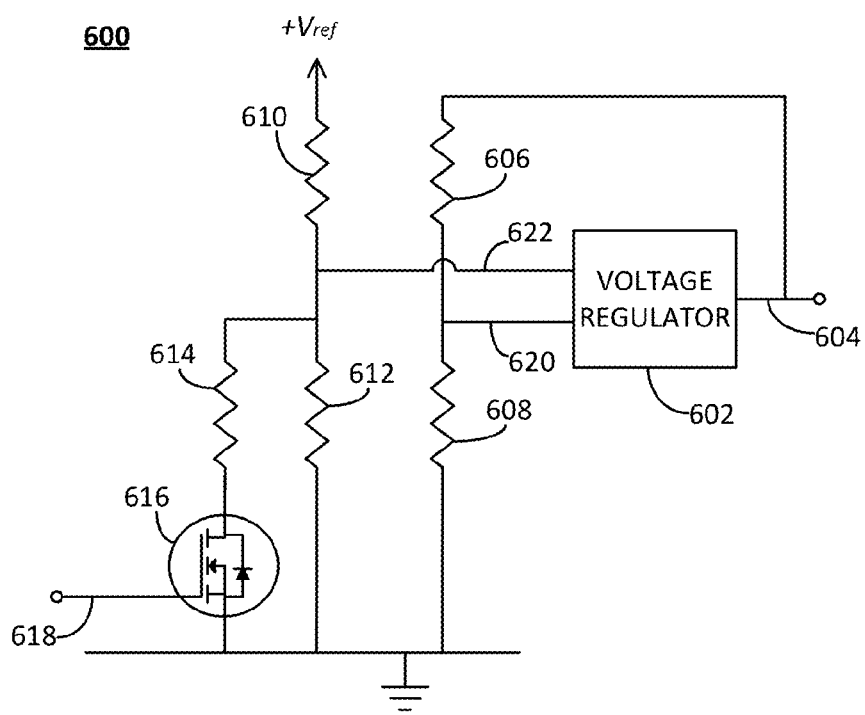
FIG. 6 is a circuit schematic of a multi-level voltage source in accordance with some embodiments.

FIG. 6 is a circuit schematic of a multi-level voltage source 600 in accordance with some embodiments. The multi-level voltage source 600 can be used in some embodiments as a selectable DC voltage source 126 as in FIG. 1. The multi-level voltage source 600 includes a voltage regulator 602 that provides a regulated DC output voltage 604 that can be provided to the microphone input line 114. The voltage regulator receives feedback of its output 604 on a first input 620, that can be divided, for example, by resistors 606, 608. The voltage regulator 602 controls its output 604 so that input 620 is at the same voltage level as a second input 622. The voltage on the second input 622 is derived from a controllable voltage divider comprised of resistors 610, 612, 614, and switch 616. The switch 616 is responsive to an input 618, which can be a digital input, and switches resistor 614 in parallel with resistor 612, or effectively disconnect resistor 614 from being in parallel with resistor 612, depending on whether switch 616 is closed or open, respectively. When switch 616 is open, a stable reference voltage +Vref is divided across resistors 610 and 612. The stable voltage reference +Vref can be, for example, from a regulated power supply. When switch 616 is closed, resistor 614 will be connected substantially in parallel with resistor 612, resulting in a lower effective resistance between input 622 and the ground, dropping the voltage at input 622, and causing the voltage regulator 602 to lower its output 604 in correspondence. Thus, operating the switch 616 via input 618 can change the voltage output 604. The switch 616 can be opened to operate the two-way radio device system 100 in one mode (PTT or hands-free), and it can be closed to operate the two-way radio device system 100 in the other mode since each switch state (open or closed) results in a different voltage level being applied to microphone input live 114 via output 604.

Figure 7:
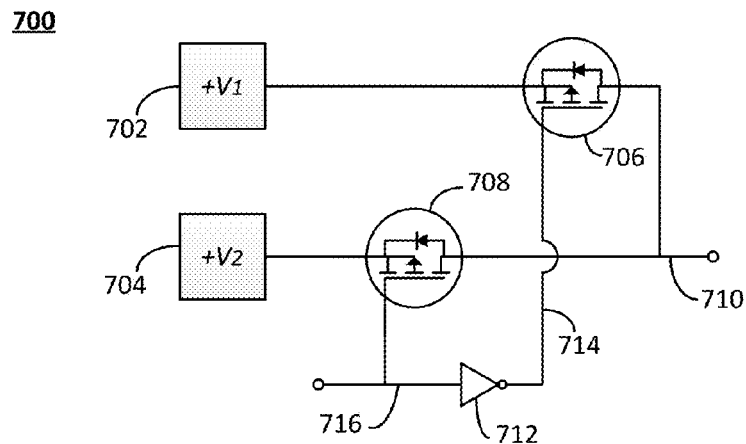
FIG. 7 is a circuit schematic of a multi-level voltage source in accordance with some embodiments.

FIG. 7 is a circuit schematic of a multi-level voltage source 700 in accordance with some embodiments. The multi-level voltage source 700 can be used in some embodiments as a selectable DC voltage source 126 as in FIG. 1. The multi-level voltage source 700 provides an output 710 that can be provided to microphone input line 114. The output 710 is one of a plurality of exclusively selectable voltage sources 702, 704, which each provide a different DC voltage level and are connectable to the output 710 through switches 706, 708. A selection signal 716 controls which switch 706, 708 is open and which is closed. For example, the selection signal 716 can be directly connected to switch 708, and connected to switch 706 through an inverter 712. Thus, an inverted selection signal 714 is provided to switch 706. The selection signal can be bistable, operable in either a high voltage state or a low voltage state. In the low voltage state, for example, switch 708 can be closed, and thus switch 706 will be open, connected voltage source 704 to the output 710. When the selection signal 716 is high, switch 708 will be open and switch 706 will be closed, connecting voltage source 702 to the output 710. Accordingly, the selection signal 716 can be controlled to correspond to either a PTT mode or a hands-free mode.

Figure 8:
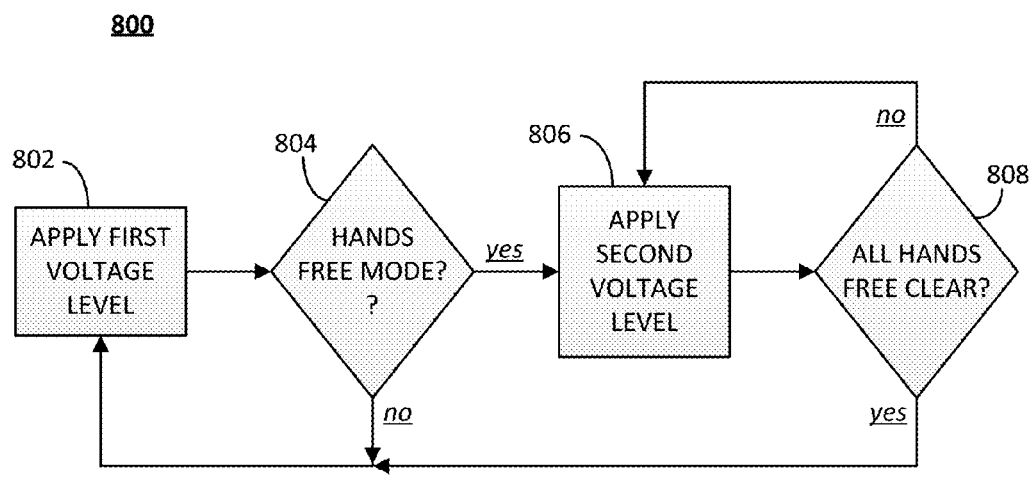
FIG. 8 is a flowchart diagram of a method of controlling a microphone bypass switch in accordance with some embodiments.

FIG. 8 is a flowchart diagram of a method 800 of controlling a microphone bypass switch in accordance with some embodiments. Specifically, the method 800 can be used to operate or control a two-way radio device system 100 as in FIG. 1, and either bypass the PTT switch 120 or not, depending on whether the two-way radio device system 100 is to be operated in a PTT mode or a hands-free mode. As an initial matter, the system 100 is powered on, the audio accessory is connected to, and detected by the two-way radio, and the two-way radio device system 100 can be operated initially by default in the PTT mode, meaning the PTT switch 120 is not electrically bypassed, and the voltage provided on the microphone input line 114 is at a first level. Thus, the method 100 shows in process 802 that the first voltage level is applied, such as to the microphone input 114 of the audio accessory 104. The method then determines if there has been an indication to operate in the hands-free mode in process 804. The indication can come from a user of the two-way radio device system 100, such as by selecting the hands-free mode in a menu. The indication can, in some embodiments, come from a remote source via a command signal transmitted to the two-way radio 102 so that others can remotely monitor audio at the two-way radio 102. If there is no indication to operate in the hands-free mode, the method simply maintains the first voltage at the microphone input and continues to monitor for an indication to operate in a hands-free mode. If there is an indication to operate in the hands free mode, the method operates to apply the second voltage level to the microphone input line 114, as indicated at process 806. The second voltage level is in a range corresponding to a hands-free operation, and causes the PTT button 120 to be electrically bypassed so that any audio signals produced by the microphone are provided to the two-way radio, regardless of the PTT switch 120. After applying the second voltage level at process 806, the method then checks to determine whether all indications to operate in the hands-free mode have been cleared in process 808. It is contemplated that, for example, the user can select hand-free mode, and while operating in the hands-free mode, the two way radio 102 can receive a remote command to operate in the hands free mode, and subsequent to receiving the command, the user de-selects the hands-free mode. However, if a remote command has not been received to cease hands-free operation, then despite the user's de-selection, the two-way radio will continue to operate in the hands-free mode. Once all indication for hands-free operation has cleared, the method returns to process 802 and changes the voltage at the microphone input back to the first level, which is in a range corresponding to the PTT mode of operation where the PTT switch 120 must be closed, such as by pressing a PTT button to close the PTT switch 120. Thus, in PTT mode, audio signals produced by the microphone will only be provided to the two-way radio 102 while the PTT switch is closed.

Accordingly benefits of the disclosed embodiments include the ability of a user to operate two-way radio device system having only a two conductor speaker jack and a two conductor microphone jack in a hands-free mode such that the user does not have to press the PTT button on the audio accessory to transmit. Similarly, embodiments also allow a remote party to activate the microphone of an audio accessory of a user's two-way radio device system to allow the remote party to monitor audio at the user's location (with or without the user's knowledge). The embodiments obviate the need for multi-conductor accessory connectors that have control lines in addition to speaker and microphone lines.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An apparatus, comprising:
   a microphone operable with a direct current (DC) bias voltage in both a first voltage range and a second voltage range;
   a push to talk (PTT) switch electrically coupled in series with the microphone between the microphone and a microphone input; and
   a voltage controlled switch circuit comprising a first transistor switch element coupled in parallel with the PTT switch, and a second transistor switch coupled to the first transistor switch that is operable to close the first transistor switch only when an input voltage on the microphone input is in the first voltage range, and to open the first transistor switch when the input voltage on the microphone line is not in the first voltage range.

2. The apparatus of claim 1, wherein the first voltage range is any voltage higher than a threshold voltage level of the voltage controlled switch circuit.

3. The apparatus of claim 2, wherein the first transistor switch is a P-type transistor, the second transistor switch is an N-type transistor, the apparatus further comprising a zener diode coupled in series with a resistance between the microphone input and a ground reference, the second transistor switch has a gate coupled to a junction of the zener diode and the resistance.

4. The apparatus of claim 1, wherein the apparatus is an audio accessory further comprising a speaker configured to be connected to a two-way radio.

5. A method, comprising:
   detecting connection of an audio accessory to a two-way radio, the audio accessory containing a push to talk (PTT) switch coupled in series between a microphone and a microphone input of the audio accessory, a voltage controlled bypass switch connected in parallel with the PTT switch and operable to be closed upon application of a voltage above a threshold level on the microphone input;
   applying a first voltage level to the microphone input, the first voltage level being below the threshold level;
   detecting an indication to operate the microphone in a hands-free mode; and
   responsive to detecting the indication to operate in the hands-free mode, applying a second voltage level to the microphone input, the second voltage level being above the threshold level causing the voltage controlled bypass switch to close.

6. The method of claim 5, further comprising:
   subsequent to detecting the indication to operate in the hands-free mode, detecting an end of the indication to operate in the hands-free mode; and
   responsive to detecting the end of the indication to operate in the hands-free mode, resetting the voltage applied to the microphone input to a level below the threshold level.

7. The method of claim 5, wherein detecting the indication to operate in the hands-free mode comprising detecting a user input at the two-way radio to operate in the hands-free mode.

8. The method of claim 5, wherein detecting the indication to operate in the hands-free mode comprising detecting a remote command received at the two-way radio via a radio signal to operate in the hands-free mode.

9. The method of claim 5, further comprising,
   responsive to detecting the indication to operate in the hands-free mode, detecting voice activity at the microphone by the two-way radio; and
   responsive to detecting voice activity at the microphone the two-way radio transmitting a radio signal including an audio signal from the microphone.

10. The method of claim 5, wherein applying the second voltage level to the microphone input comprises adjusting a voltage source of the two-way radio to change from the first voltage level to the second voltage level.

11. The method of claim 5, wherein applying the second voltage level to the microphone input comprises switching from a first voltage source providing the first voltage level to a second voltage source providing the second voltage level.

12. The method of claim 5, wherein detecting the indication to operate in the hands-free mode comprises detecting a first indication to operate in the hands free mode, the method further comprises:
    detecting a second indication to operate in the hands free mode prior to an end of the first indication to operate in the hands free mode; and continuing to operate in the hands free mode until both the first and second indications to operate in the hands free mode have ended.

13. The method of claim 12, wherein:
the first indication to operate in the hands free mode is one of either a user input at the two-way radio or a remote command received at the two-way radio via a radio signal; and
the second indication to operate in the hands free mode is the other of the user input at the two-way radio and the remote command received at the two-way radio via a radio signal.

14. The method of claim 5 wherein causing the voltage controlled bypass switch to close comprises causing a P-type transistor switch coupled in parallel with the PTT switch to close.

15. A two-way radio device system, comprising:
a two-way radio operable to transmit and receive radio signals and including an accessory connector that has a speaker connection and a microphone input, and configured to apply a first voltage level to the microphone input for operating in a push to talk (PTT) mode and to apply a second voltage level to the microphone input for operating in a hands free mode;
an audio accessory configured to be coupled to the two-radio at the accessory connector and including:
a speaker operably coupled to the speaker connection;
a microphone;
a PTT switch operably coupled in series between the microphone and the microphone input; and
a voltage controlled switch, including a PTT bypass switch element coupled in parallel with the PTT switch of the audio accessory, that is operable to close the PTT bypass switch element responsive to the second voltage level being applied to the microphone input, and to open the PTT bypass switch element responsive to the first voltage being applied to the microphone input.

16. The two-way radio device system of claim 15, wherein:
the PTT bypass switch element comprises a P-type transistor coupled in parallel with the PTT switch of the audio accessory;
the voltage controlled switch further comprises an N-type transistor coupled to the P-type transistor and operable to control switching of the P-type transistor;
the voltage controlled switch further comprises a zener diode coupled in series with a resistance between the microphone input and a ground reference, wherein a gate of the N-type transistor is coupled to a junction of the zener diode and the resistance.

17. The two-way radio device system of claim 15, wherein the first voltage is any voltage higher than a threshold voltage level of the voltage controlled switch.

18. The two-way radio device system of claim 15, wherein the speaker connection comprises a speaker jack, and the microphone input comprises a microphone jack.

* * * * *